No. 638,461. Patented Dec. 5, 1899.
G. R. HOUGHTON.
BUNCHING APPARATUS FOR ASPARAGUS.
(Application filed June 10, 1898.)
(No Model.)
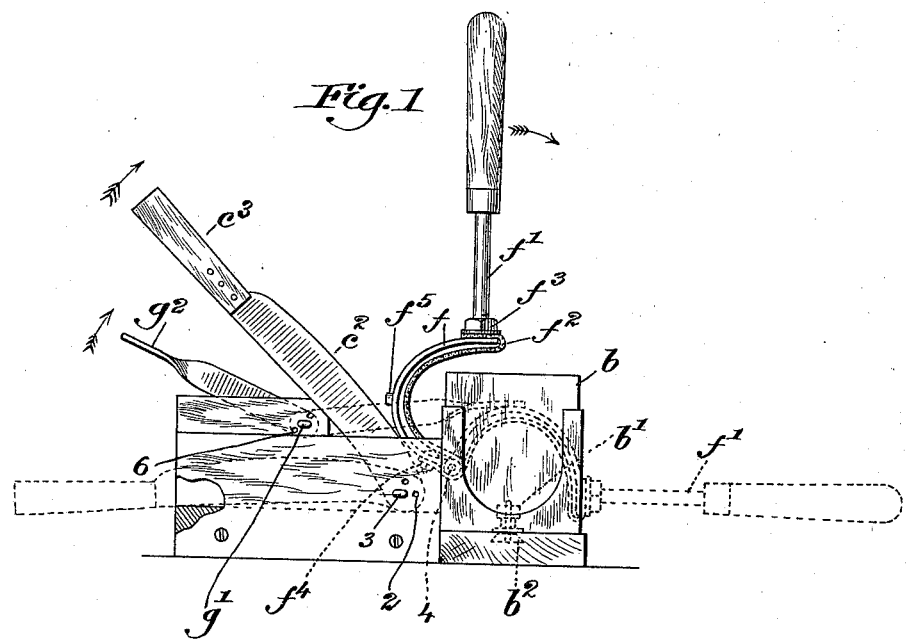
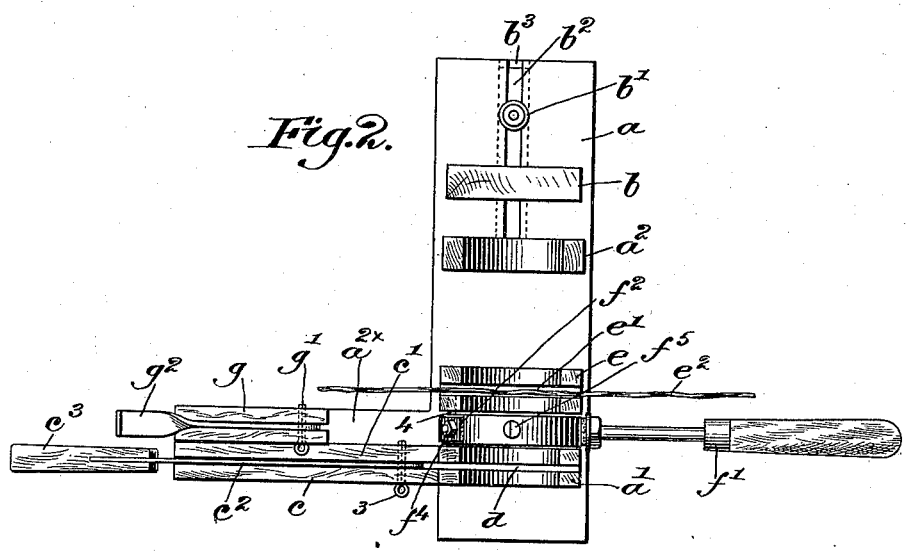
Witnesses:
A. C. Harmon
Louis N. Gowell
Inventor.
George R. Houghton,
by Crosby Gregory
attys.

UNITED STATES PATENT OFFICE.

GEORGE R. HOUGHTON, OF HARVARD, MASSACHUSETTS.

BUNCHING APPARATUS FOR ASPARAGUS.

SPECIFICATION forming part of Letters Patent No. 638,461, dated December 5, 1899.

Application filed June 10, 1898. Serial No. 683,121. (No model.)

*To all whom it may concern:*

Be it known that I, GEORGE R. HOUGHTON, of Harvard, in the county of Worcester and State of Massachusetts, have invented an Improvement in Bunching Apparatus for Asparagus, &c., of which the following description, in connection with the accompanying drawings, is a specification, like letters and figures on the drawings representing like parts.

This invention has for its object the production of an apparatus by which to form asparagus into bunches and at the same time cut off the butt-end of the bunches smoothly, the length of the bunches being properly gaged.

The apparatus herein to be described has a series of rests, preferably concaved, in which the asparagus to be bunched is laid, the edible top ends thereof preferably resting against the length-gage, which may be adjusted. The asparagus laid upon the rests is acted upon by a clamp, shown as a lever having a flexible face, which may adapt itself to the asparagus without injuring the same when gathering the asparagus into a round bunch. While the bunch is held clamped the usual grass or other string, it being contained in a tying-guide, is brought up about the asparagus and tied, so that the tying is always at a uniform distance with relation to the butt-end of the bunch. While the asparagus is in the rests and clamped the butt-ends are cut off by a suitable knife under the control of the buncher, thus leaving the butt-end of the bunch uniform and straight.

The knife referred to when not in use is concealed in a knife-guard, so that there is no chance for the girls who do the bunching to cut their fingers.

Figure 1, in end elevation, represents my improved bunching apparatus, the full lines showing the clamp and the knife elevated, the dotted lines showing the clamp closed; and Fig. 2 is a top or plan view of Fig. 1 with the clamp closed, the drawing also showing a piece of tying-grass in the tying-guide.

Referring to the drawings, let $a$ represent a suitable foundation plate or bed, to which is secured suitable rests $a'$ $a^2$, said rests being herein represented as concaved and adapted to have laid into them the asparagus which is to be formed into a bunch.

The foundation-plate $a$ has erected upon it an end gage $b$, which may be made adjustable toward and from the rest $a^2$, according to the length of the bunch to be tied, it being supposed that the more edible top ends of the asparagus being bunched will be brought up against the said gage. This gage, which may be of any usual or suitable shape, may be adjusted toward or from the rest $a^2$ by loosening the nut $b'$, connected with the shank $b^2$ of the said gage, said shank being herein represented as adapted to slide in a suitable groove $b^3$ of the foundation-plate.

The foundation-plate $a$ is herein represented as having an extension $a^{2\times}$, upon which are erected two uprights or boards $c$ $c'$ to constitute a knife-guard, said uprights being shown as provided with a series of holes, as 2, (see Fig. 1,) to receive a suitable pivot 3, shown as a cotter-pin, upon which is mounted the end of a blade or knife $c^2$, it having a suitable handle $c^3$, said blade being adapted to be received between the two uprights or boards $c$ $c'$, as represented by dotted lines in Fig. 1, when the knife or blade is in its normal inoperative position. The rest $a'$ has a groove $d$, in which the knife or blade works when the same is turned fully over to the right, viewing Fig. 1. Between the rests $a'$ $a^2$ I have mounted a tying-guide $e$, it being shaped to resemble the rests $a'$ $a^2$, and it may form an additional or auxiliary rest; but it is provided with a slot, as at $e'$, in which is laid the usual grass $e^2$, with which to tie the asparagus together into bunch form. By locating the grass in the tying-guide it is possible to always tie the grass at just the same point with relation to the bunch of asparagus to be produced in this apparatus.

Between part of the tying-guide and a part of the rest $a'$ and sustained thereby is a pivot 4, (shown by dotted lines in Fig. 1 and partially in Fig. 2,) said pivot receiving upon it one end of a metallic yoke $f$, (herein represented as provided with a handle $f'$,) so as to form a lever, so by turning the lever into the dotted-line position, Fig. 1, the asparagus laid in the rests may be bunched together firmly into substantially circular form.

It would not answer to clamp the tender asparagus by a metallic surface, such as the yoke $f$; but I have provided the lever with an elastic or flexible band or face $f^2$. One end of said band is shown as secured on the yoke by a nut $f^3$, and the other end of the band is secured to the yoke by a suitable bolt $f^4$, the strap or band lying out of contact with the yoke from one to its other end next the asparagus to be bunched. The yoke is herein shown as provided at its outer side with a stop or projection $f^5$.

The extension $a^{2\times}$ of the plate $a$ has other uprights $g$, provided with an adjustable pivot $g'$, shown as a cotter-pin, adapted to be inserted into either one of a series of, as herein shown, three holes, (see Fig. 1,) said pivot receiving upon it a locking device $g^2$, shown as a pivoted arm or finger.

In operation the person to bunch the asparagus will lay a certain quantity of it into the rests $a'$ $a^2$, with the more edible top ends of the asparagus against the gage $b$. The gage will be set at the proper distance from the rest $a^2$, said asparagus also lying in the tying-guide $e$. Before applying the asparagus to the rest the tying-grass $e^2$ will be laid in the tying-guide. The buncher will put her hand upon the asparagus, preferably between the rest $a^2$ and the tying-guide $e$, slightly gathering it into a bunch, and the lever $f'$ will be turned over to the right in the direction of the arrow, Fig. 1, into the dotted-line position in said figure, during which operation the flexible band $f^2$, constituting the movable member of the clamp, will act upon the asparagus and will crowd it firmly together in the rests. As the lever is turned into the dotted-line position the buncher will engage and turn the locking device $g^2$ over in the direction of the arrow near its end into the dotted-line position, Fig. 1, the end of said locking device coming upon the stop $f^5$, so that when the hand is removed from the lever the latter will be held in position to retain the asparagus in its compressed state. This done, the girl will usually engage the grass $e^2$, pull its ends up over the ends of the bunch of asparagus held clamped, and tie the grass firmly, so that when the clamp is opened the grass will hold it, as in usual manner, in bunch form. While the asparagus is in the rests, as stated, the buncher will engage the handle $c^3$ of the knife or blade and will turn it over in the direction of the arrow near its end, Fig. 1, so that the blade $c^2$ will enter the groove $d$ of the rest $a'$ and cut off smoothly and evenly the butt-ends of the asparagus. In this condition the lever $f'$ may be again turned back into its normal position. (Represented by full lines Fig. 1.) The strap or band $f^2$ may be taken up or tightened when desired by removing the nut from the bolt $f^4$ and adjusting the free end of the strap on said bolt.

As the blade or knife is ground away to keep it sharp, it is necessary to change the pivot 3, putting it into one or the other of the holes 2 in order that the angle of presentation of the cutting edge of the blade or knife may be properly controlled, and so, also, as the bunches of asparagus vary in size it is necessary that the clamp be closed more or less, and to lock it in its closed position the locking device $g^2$ must be adjusted by a pin $g'$ in one or the other of the holes 6, so that the end of said locking device will coöperate properly with the projection $f^5$ of the clamp.

Believing myself to be the first to employ a flexible strap in connection with a clamping-lever to aid in bunching asparagus and the like, this invention is not limited to the particular shape shown for the lever or devices carrying the strap, nor to the particular shape shown for the plate $a$, nor to the particular means for adjusting the gage $b$, nor to the means shown for attaching the rests to the plate.

Having described my invention, what I claim as new, and desire to secure by Letters Patent, is—

1. In an apparatus of the class described, a plurality of separated concave rests facing upward to receive the asparagus or material to be bunched, combined with a clamp having a flexible or elastic face to contact with the asparagus.

2. In an apparatus of the class described, a plurality of concave rests, said rests facing upward to receive the asparagus and having an open space between them to enable the operator to grasp the asparagus and gather it into a bunch, and a flexible-faced clamp facing downward to clamp and retain the gathered asparagus in the rests, combined with a gage for the top ends of the asparagus, substantially as described.

3. In an apparatus of the class described, a concave rest to receive and support the asparagus to be bunched, combined with a lever pivoted at or near one end and provided with a flexible and readily-yielding face to adjust itself to the asparagus and crowd it into the said rest, substantially as described.

4. In an apparatus of the class described, a series of concave rests to receive the asparagus to be bunched, a lever having an attached flexible face to act on the asparagus laid in said rests, said rests having grooves to constitute a tying-guide whereby the usual grass may be located uniformly with relation to the asparagus to be tied, substantially as described.

5. In an apparatus of the class described, concave rests, said rests being separated and having their concavities facing upward to receive the asparagus, a lever having an attached flexible face to clamp the asparagus and form it into a bunch in the said rests, combined with an independent pivoted knife or blade to thereafter sever the ends of the bunched asparagus, substantially as described.

6. In an apparatus of the class described, concave rests separated from each other and opening upwardly to support the asparagus, a clamp composed of a lever having an attached flexible face to act upon the asparagus laid in said rests, said rests having tying-guides to receive the tying-grass, combined with a pivoted knife or blade to cut uniformly the butt-ends of the clamped asparagus, substantially as described.

7. In an apparatus of the class described, concave rests to receive the asparagus, a clamp made as a lever having an attached flexible face to contact with the upper side of the asparagus laid in said rests, a gage to position the top ends of the asparagus, and a pivoted blade or cutter to cut off the butt-ends of the asparagus, substantially as described.

8. In an apparatus of the class described, a bed, a concave upwardly-facing rest on said bed for the asparagus, a clamp composed of a pivoted lever having a yielding band attached to it at both ends to contact with the upper side of the asparagus laid in said rest, one end of said band being adjustably connected with said lever, substantially as described.

In testimony whereof I have signed my name to this specification in the presence of two subscribing witnesses.

GEORGE R. HOUGHTON.

Witnesses:
 EDWIN A. HILDRETH,
 CORA A. HOUGHTON.